United States Patent
Helbing et al.

(10) Patent No.: US 7,286,771 B2
(45) Date of Patent: Oct. 23, 2007

(54) MULTI-CHANNEL OPTICAL TRANSMITTER INCORPORATING A TUNABLE OPTICAL SIGNAL SOURCE AND METHOD FOR TRANSMITTING A MULTI-CHANNEL OPTICAL SIGNAL

(75) Inventors: Rene Helbing, Palo Alto, CA (US); Ian Hardcastle, Sunnyvale, CA (US)

(73) Assignee: Avago Technologies Fiber IP (Singapore) Pte Ltd, Singapore (AG)

( * ) Notice: Subject to any disclaimer, the term of this patent is extended or adjusted under 35 U.S.C. 154(b) by 925 days.

(21) Appl. No.: 10/122,066

(22) Filed: Apr. 11, 2002

(65) Prior Publication Data

US 2004/0208637 A1  Oct. 21, 2004

(51) Int. Cl.
*H04B 10/04* (2006.01)

(52) U.S. Cl. ............... 398/194; 398/182; 398/183; 398/79; 398/93; 398/94; 398/95; 398/192; 398/195; 398/196; 398/197; 372/29; 372/38; 372/32; 372/34

(58) Field of Classification Search .......... 398/93, 398/94, 72, 87, 195, 79, 68, 182, 183, 192, 398/194, 196, 197, 95; 372/20.012, 29, 38, 372/32, 34
See application file for complete search history.

(56) References Cited

U.S. PATENT DOCUMENTS

| | | | | |
|---|---|---|---|---|
| 5,508,845 A * | 4/1996 | Frisken | | 398/146 |
| 5,537,238 A * | 7/1996 | Janniello et al. | | 398/93 |
| 6,137,613 A * | 10/2000 | Ushirozawa | | 398/94 |
| 6,449,074 B1* | 9/2002 | Okano et al. | | 398/91 |
| 6,661,815 B1* | 12/2003 | Kozlovsky et al. | | 372/20 |
| 6,842,587 B1* | 1/2005 | McGhan et al. | | 398/201 |
| 6,895,025 B2* | 5/2005 | Herble et al. | | 372/9 |

* cited by examiner

*Primary Examiner*—Hanh Phan (57) ABSTRACT

The multi-channel optical transmitter is composed of a tunable optical signal source, an optical multiplexer and an intensity reducer. The tunable optical signal source includes a tunable laser, and additionally includes an optical signal output through which it outputs an optical signal to one of the inputs of the optical multiplexer. The intensity reducer is for reducing the intensity of the optical signal output by the optical signal source during tuning of the tunable laser. The intensity reducer prevents the tunable optical signal source from injecting high levels of noise into the channels during tuning of the tunable optical signal source.

21 Claims, 4 Drawing Sheets

FIG.5D

MULTI-CHANNEL OPTICAL TRANSMITTER INCORPORATING A TUNABLE OPTICAL SIGNAL SOURCE AND METHOD FOR TRANSMITTING A MULTI-CHANNEL OPTICAL SIGNAL

BACKGROUND OF THE INVENTION

The information carrying capacity of an optical communication system can be increased by wavelength division multiplexing (WDM) or dense wavelength division multiplexing (DWDM). Unless otherwise stated, the term wavelength division multiplexing will be used in this disclosure to encompass both wavelength division multiplexing and dense wavelength division multiplexing.

In wavelength division multiplexing, multiple optical signals, each having a different wavelength, are carried by a single optical fiber. Each optical signal is modulated with a different information signal. Thus, a single optical fiber can carry n information signals, where n is the number of optical signals carried by the optical fiber.

The optical signals are multiplexed before being fed into the optical fiber. At the output of the optical fiber, the optical signals are de-multiplexed so that the information signal carried by each optical signal can be recovered. Alternatively, the optical signals, or a sub-set of them, may be transferred to another optical fiber for onward transmission.

Recently, tunable lasers whose emission wavelengths are capable of being tuned over a wavelength range that spans multiple channels of a wavelength-division multiplexing system have been proposed. Using a tunable laser to generate an optical signal for transmission via an optical communication system that employs WDM further increases the practical information carrying capacity of the optical communication system. For example, the wavelength of the light generated by the tunable laser can be set to the wavelength of a currently-unused channel of the optical communication system. This allows the unused channel to transmit an information signal. Later, when an information signal having a higher priority is scheduled to use the channel, the wavelength of the tunable laser can be changed to that of another channel that is currently unused. Transmission of the information signal can then continue via the other channel.

Incorporating a tunable laser in one or more of the optical signal sources incorporated in an optical transmitter connected to the optical communication system enables such optical signal sources to transmit information signals via channels that would otherwise be unused or under-used.

However, tuning a tunable laser between a source channel and a destination channel causes the problem of a momentary high level of noise in each channel that lies between the source channel and the destination channel. The high level of noise occurs in a given channel as the wavelength of the light generated by the tunable laser sweeps through the wavelength range of the channel. Such noise is usually unacceptable as it disturbs the integrity of the information signal transmitted via the channel. In addition, the optical communication system typically includes amplifying and other optical elements that can be caused to malfunction by the signal from the tunable laser as the laser is tuned.

Thus, what is needed is a multi-channel optical transmitter incorporating a tunable optical signal source in which tuning the tunable optical signal source does not cause high levels of noise in the channels over which the wavelength of the light generated by the tunable optical signal source is tuned.

SUMMARY OF THE INVENTION

The invention provides a multi-channel optical transmitter composed of a tunable optical signal source, an optical multiplexer and an intensity reducer. The optical multiplexer includes inputs and an output. The tunable optical signal source includes a tunable laser, and additionally includes an optical signal output through which the tunable optical signal source outputs an optical signal to one of the inputs of the optical multiplexer. The intensity reducer is for reducing the intensity of the optical signal output by the tunable optical signal source during tuning of the tunable laser. The intensity reducer prevents the tunable optical signal source from injecting high levels of noise into the channels during tuning of the tunable laser.

An embodiment of the multi-channel optical transmitter additionally includes an auxiliary laser and an activating element. The auxiliary laser has a light output coupled to another of the inputs of the optical multiplexer. The activating element is for activating the auxiliary laser when the intensity reducer reduces the intensity of the optical signal. The auxiliary laser prevents optical elements that receive the optical signal output by the multi-channel optical transmitter from malfunctioning as a result of the intensity of the optical signal being reduced.

The invention additionally provides a method for generating a multi-channel optical signal. In the method, a first optical signal is generated and at least one second optical signal is provided. The at least one second optical signal has wavelengths differing from one another and from the wavelength of the first optical signal. The wavelength of the first optical signal is changed. The intensity of the first optical signal is reduced during the changing of its wavelength. Finally, the first optical signal is combined with the at least one second optical signal. Reducing the intensity of the first optical signal during the changing of its wavelength prevents the first optical signal from injecting high levels of noise into the channels.

In an embodiment of the method, an auxiliary optical signal is additionally generated during the changing of the wavelength. In combining the first optical signal with the at least one second optical signal, the auxiliary optical is additionally combined with the first optical signal and the at least one second optical signal. Generating the auxiliary optical signal and combining it with the first optical signal and the at least one second optical signal prevents optical elements that receive the multi-channel optical signal from malfunctioning as a result of the intensity of the first optical signal being reduced.

DETAILED DESCRIPTION OF THE INVENTION

Figure 1:
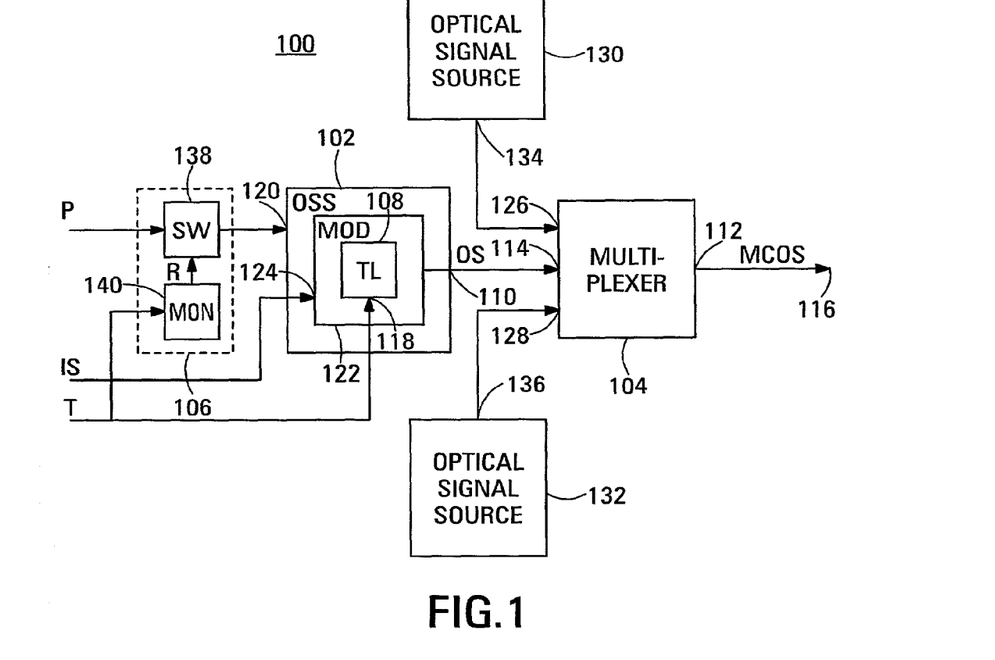
FIG. 1 is a schematic diagram of a first embodiment of a multi-channel optical transmitter according to the invention.

FIG. 1 shows a first embodiment 100 of a multi-channel optical transmitter according to the invention. The optical transmitter 100 is composed of the tunable optical signal source 102, the optical multiplexer 104 and the intensity reducer 106. The optical transmitter transmits a multi-channel optical signal, i.e., multiple optical signals, each of which is assigned to a different channel. A channel is a range of wavelengths within which the wavelength of the optical signal assigned to the channel must remain. In a typical WDM optical transmission system operating in the 1.55 μm wavelength range, the center wavelengths of the channels are separated by about 1.6 nm. The center wavelengths are separated by one-half or one-quarter of this amount in DWDM systems.

The tunable optical signal source 102 includes the tunable laser 108 and the optical signal output 110. The optical multiplexer 104 includes the output 112 and multiple inputs, including the input 114. The output 112 is optically coupled to the output 116 of the optical transmitter 100. The input 114 is optically coupled to the optical signal output 110 of the tunable optical signal source.

The tunable laser 108 includes the tuning control input 118 via which it receives a tuning control signal T. The tunable laser is capable of being tuned to generate light with any wavelength in the wavelength range of channels M through N of the optical transmitter 100. The channels M to N may be all the channels of the optical transmitter, or may be a subset of the channels of the optical transmitter.

The tunable optical signal source 102 includes the power input 120 through which it receives electrical power P. The tunable optical signal source also includes the modulator 122, depicted schematically. The modulator includes the modulation input 124 via which it receives the information signal IS. The modulator operates in response to the information signal IS to modulate the light generated by the tunable laser 108. Modulating the light generated by the tunable laser generates the optical signal OS. The tunable optical signal source outputs the optical signal OS at the optical signal output 110.

As noted above, the optical multiplexer 104 has multiple inputs. Exemplary inputs 114, 126 and 128 are shown. The multiplexer typically has more than three inputs, but an example having three inputs will be described to simplify the description. Also shown are the optical signal sources 130 and 132 that have the optical signal outputs 134 and 136, respectively. The optical signal output 134 of the optical signal source 130 is connected to the input 126 of the multiplexer. The optical signal output 136 of the optical signal source 132 is connected to the input 128 of the multiplexer. The optical signal sources 130 and 132 are examples of a typically larger number of optical signal sources (not shown) optically coupled to corresponding inputs (not shown) of the multiplexer.

Each of the optical signal sources 130 and 132 includes a laser (not shown). The laser may be either a fixed-wavelength laser or a tunable laser. The light generated by the laser of optical signal source 130 has a wavelength that corresponds to one of the channels of the optical transmitter 100 and the light generated by the laser of optical signal source 132 has a wavelength that corresponds to another of the channels of the optical transmitter. In the example described, the light generated by the lasers of optical signal sources 130 and 132 will be assumed to have wavelengths that correspond to different channels in the channel range M-N, described above.

Each of the optical signal sources 130 and 132 additionally includes a modulator (not shown) that modulates the light generated by the laser included the optical signal source with a respective information signal (not shown) to generate a respective optical signal that is fed to the inputs 126 and 128, respectively, of the multiplexer 104. The multiplexer multiplexes the optical signal OS output by the tunable optical signal source 102 and the optical signals output by the optical signal sources 130 and 132 to form the multi-channel optical signal MCOS. The multi-channel optical signal passes from the output 112 of the multiplexer to the output 116 of the optical transmitter 100.

Tuning the wavelength of the tunable laser 108 from channel M to channel N, for example, causes the wavelength of the optical signal OS to sweep through the wavelength ranges of all the channels between channels M and N. If the optical signal OS output by the tunable optical signal source 102 were permitted to be output by the multi-channel optical transmitter 100 during the tuning operation, the optical signal OS would appear as noise in the optical signals output by the optical signal sources 130 and 132. Such noise would be unacceptable in many applications.

To overcome the problem just described, the optical transmitter 100 according to the invention includes the intensity reducer 106 coupled to the tunable optical signal source 102. The intensity reducer performs the function of reducing the intensity of the optical signal OS output by the tunable optical signal source 102 during tuning of the tunable laser 108.

In the example shown in FIG. 1, the intensity reducer is composed of the switching element 138 connected in series with the power input 120 of the tunable optical signal source 102. The switching element operates to disconnect power from the tunable optical signal source during tuning of the tunable laser 108. Disconnecting power from the tunable optical signal source reduces the intensity the optical signal OS to zero. Specifically, the switching element operates to disconnect power only from the light-generating portion of the tunable optical signal source. The switching element does not disconnect power from the tuning elements of the tunable optical signal source.

Reducing the intensity of the optical signal OS to zero is not critical to the invention. The intensity reducer 106 may reduce the intensity of the optical signal to greater than zero. The maximum to which the intensity of the optical signal is reduced is determined by the signal-to-noise ratio specifications of the optical transmitter 100. The maximum intensity need be no greater than the intensity that allows the optical transmitter to meet its signal-to-noise ratio specification during tuning of the tunable laser 108. The signal-to-noise ratio should be tested with the wavelength of the light generated by the tunable laser equal to the nominal wavelengths of the channels of the multi-channel optical transmitter 100.

Disconnecting power from the tunable optical signal source 102 prevents the tunable laser 108 from generating light while it is being tuned. As a result, the optical signal OS output to the multiplexer 104 by the tunable optical signal source has an intensity of zero during tuning the tunable laser. Once the tuning is complete, the switching element 138 re-connects power to the tunable optical signal source. This causes the tunable laser once more to generate light, and the tunable optical signal source to output the optical signal OS to the output 116.

Instead of disconnecting power to the tunable laser 108, the switching element 138 may simply reduce the power fed to the tunable laser to reduce the intensity of the optical signal OS. As a further alternative, the switching element may be connected in parallel with the tunable laser 108. In this case, the switching element operates to divert all or part of the drive current from the tunable laser during tuning of the tunable laser. This reduces the intensity of the light generated by the tunable laser, and, hence, the intensity of the optical signal OS output by the tunable optical signal source 102.

The intensity reducer 106 is additionally shown as including the monitor circuit 140 that monitors the tuning control signal T fed to the tuning control input 118 of the tunable laser 108. The monitor circuit operates to detect change in the tuning control signal and, upon detecting such change, to assert the intensity reduction control signal R. The intensity reduction control signal causes the switching element 138 to reduce the intensity of the optical signal OS output by the tunable optical signal source 102. The monitor circuit stops asserting the intensity reduction control signal when the tuning control signal stops changing. De-asserting the intensity reduction control signal causes the switching element 138 to allow the intensity of the optical signal OS to return to its normal operating range.

To prevent small changes in the tuning control signal T from causing the intensity reducer 106 to reduce the intensity of the optical signal OS, the monitor circuit 140 may assert the intensity reduction control signal R only when the change in the tuning control signal becomes sufficient to tune the tunable laser 108 to a wavelength outside the wavelength range of the channel of the optical transmitter 100 currently assigned to the optical signal OS. Small changes may occur in the tuning control signal in the course of maintaining the wavelength of the tunable laser at the center of the wavelength range of its assigned channel, for example.

As an alternative to the monitor circuit, the tuning controller (not shown) that provides the tuning control signal T may additionally provide the intensity reduction control signal R to the switching element 138, and the monitor circuit 140 may be omitted. The intensity reduction control signal is asserted during changes in the tuning control signal and causes the switching element to reduce the intensity of the optical signal OS. The tuning controller may assert the intensity reduction control signal only when the change in the tuning control signal is sufficient to tune the tunable laser 108 to a wavelength outside the wavelength range of the channel of the optical transmitter 100 currently assigned to the optical signal OS, as noted above.

Figure 2:
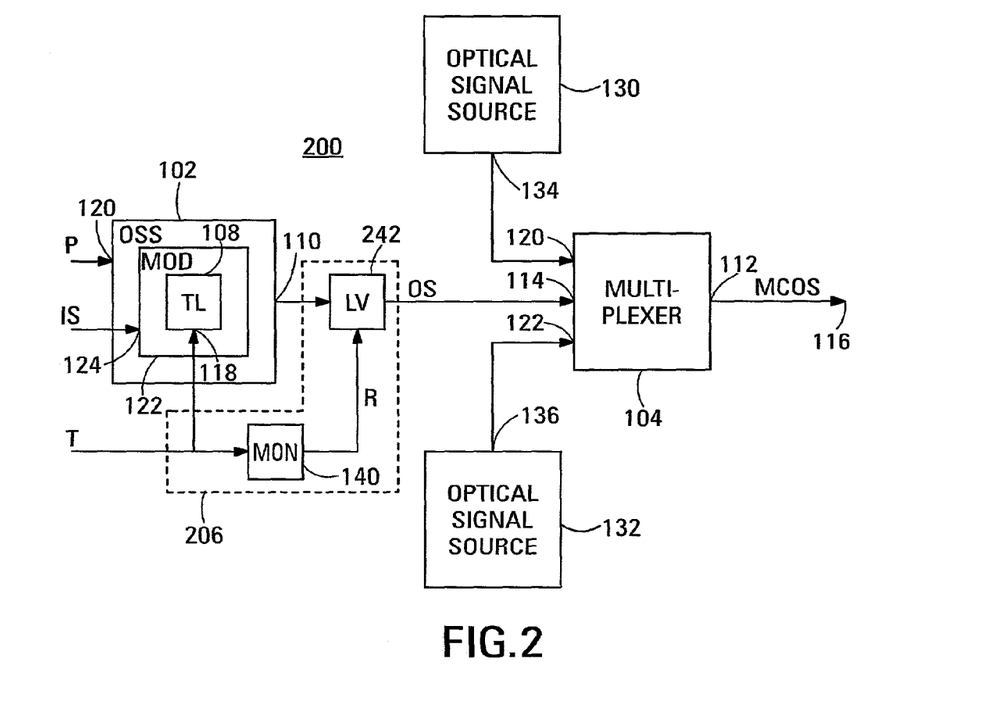
FIG. 2 is a schematic diagram of a second embodiment of a multi-channel optical transmitter according to the invention.

In some embodiments of the tunable laser 108, light generation and tuning are linked in a way that prevents the light generation from being reduced or turned off while the tunable laser being is tuned. FIG. 2 shows a second embodiment 200 of a multi-channel optical transmitter according to the invention in which the optical transmitter includes a light valve that reduces the intensity of the optical signal OS during tuning of the tunable laser 108. Elements of the optical transmitter 200 that correspond to elements of the optical transmitter described above with reference to FIG. 1 are indicated using the same reference numerals and will not be described again here.

In the optical transmitter 200, the intensity reducer 206 is composed of the light valve 242 and the optional monitor circuit 140. The light valve is interposed between the optical signal output 110 of the tunable optical signal source 102 and the input 114 of the multiplexer 104. The light valve is a two-state device having a PASS state and an ATTENUATE state. In its PASS state, the light valve passes the optical signal output by the tunable optical signal source to the multiplexer 104 with minimal attenuation.

In its ATTENUATE state, the light valve 242 attenuates the optical signal OS output by the tunable optical signal source 102, and therefore performs the function of reducing the intensity of the optical signal OS. The light valve may attenuate the optical signal by, for example, absorbing the optical signal, by reflecting the optical signal away from both the tunable optical signal source and the multiplexer 104, by causing the optical signal to interfere destructively with itself or by changing the direction of polarization of the optical signal. The maximum intensity of the optical signal OS with the light valve in its ATTENUATE state need be no greater than that which allows the optical transmitter to meet its signal-to-noise ratio specification during tuning of the tunable laser 108. As noted above, the signal-to-noise ratio should be tested with the wavelength of the light generated by the tunable laser equal to the nominal wavelengths of the channels of the multi-channel optical transmitter 100.

An absorptive or a reflecting electro-mechanical shutter may be used as the light valve 242, for example. A series arrangement of a polarizer, a transmissive, electrically-switchable half-wave device and an analyzer, or a series arrangement of a polarizer, a reflective electrically-switchable quarter-wave device and an analyzer, for example, may alternatively be used. The electrically-switchable half-wave or quarter-wave device may be based on a liquid-crystal device, for example. Such devices are known in the art. A Faraday rotator may alternatively be located between a polarizer and an analyzer.

The intensity reduction control signal R asserted by the monitor circuit 140 or by a tuning controller (not shown), as described above, sets the light valve 242 to its ATTENUATE state during tuning of the tunable laser 108. The light valve in its ATTENUATE state reduces the intensity of the optical signal OS entering the multiplexer 104. The maximum intensity of the optical signal entering the multiplexer may be as low as zero, or may be greater than zero, as described above. Once the tuning of the tunable laser is complete, the intensity reduction control signal is de-asserted. This restores the light valve to its PASS state, which restores the intensity of the optical signal OS entering the multiplexer 104 to its original range.

Figure 3:
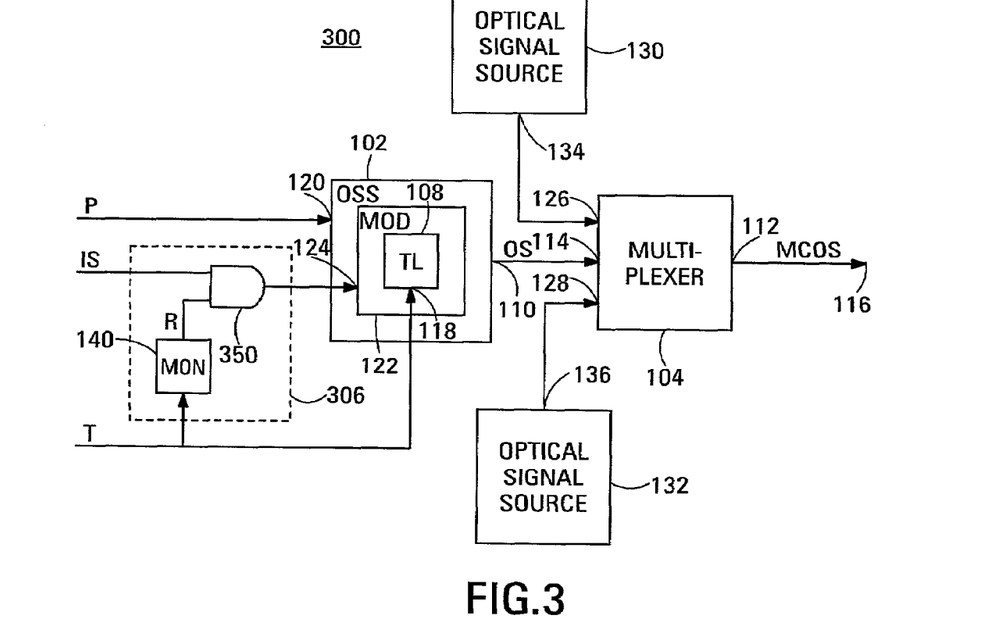
FIG. 3 is a schematic diagram of a third embodiment of a multi-channel optical transmitter according to the invention.

FIG. 3 shows a third embodiment 300 of a multi-channel optical transmitter according to the invention. In the optical transmitter 300, the modulator 122 that forms part of the tunable optical signal source 102 is used to reduce the intensity of the optical signal OS during tuning of the tunable laser 108. Elements of the optical transmitter 300 that correspond to elements of the optical transmitter described above with reference to FIG. 1 are indicated using the same reference numerals and will not be described again here.

In the optical transmitter 300, the intensity reducer 306 is composed of the gate 350 and the optional monitor circuit 140. The gate controls the modulator 122 that forms part of the tunable optical signal source 102. The modulator operates in response to the information signal IS to generate the optical signal OS by varying the intensity of the light generated by the tunable laser 108. The modulator can be regarded as having a low-intensity state in which the intensity of the optical signal is low, and a high-intensity state in which the intensity of the optical signal is high. The optical signal may have an intensity of zero in the low-intensity state of the modulator.

The tunable laser 108 may, for example, generate light having a fixed intensity and the modulator 122 may operate on the light generated by the tunable laser to generate the optical signal OS with the different intensities described above. Additionally or alternatively, the modulator may operate by changing the drive current fed to the tunable laser to cause the tunable laser to generate the optical signal OS with the different intensities described above. The modulator may alternatively generate the optical signal OS with the different intensities described above in ways other than those exemplified above.

The gate 350 is a two-input gate. The output of the gate is connected to the modulation input 124 of the modulator 122. One input of the gate is connected to receive the information signal IS. The other input of the gate is connected to receive the intensity reduction control signal R from output of the monitor circuit 140. Alternatively, the intensity reduction control signal may be supplied by the tuning controller (not shown), as described above. In this case, the monitor circuit may be omitted.

Normally, the intensity reduction control signal R is in a state that allows the gate 350 to pass the information signal IS to the modulation input 124 of the modulator 122. During tuning of the tunable laser 108, the intensity reduction control signal R changes state to one that sets the output of the gate to a state that holds the modulator in its low-intensity state. In its low-intensity state, the modulator reduces the intensity of the optical signal OS. Thus, the gate 350, operating in response to the intensity reduction control signal R, and the modulator 122 collectively perform the function of reducing the intensity of the optical signal OS output by the tunable optical signal source 102 during tuning of the tunable laser 108.

An optical communication system (not shown) incorporating the optical transmitter 100 may additionally include optical elements that malfunction when the intensity of the optical signal OS is reduced. For example, the optical communication system may include an externally-pumped optical amplifier whose pump power is shared among a number of optical signals, including the optical signal OS. When the intensity of the optical signal OS is reduced, the pump power is shared among fewer optical signals. This causes the intensities of the other optical signals, such as the optical signals generated by the optical signal sources 130 and 132, to increase during the tuning operation. Such increases in intensity can be undesirable.

Figure 4:
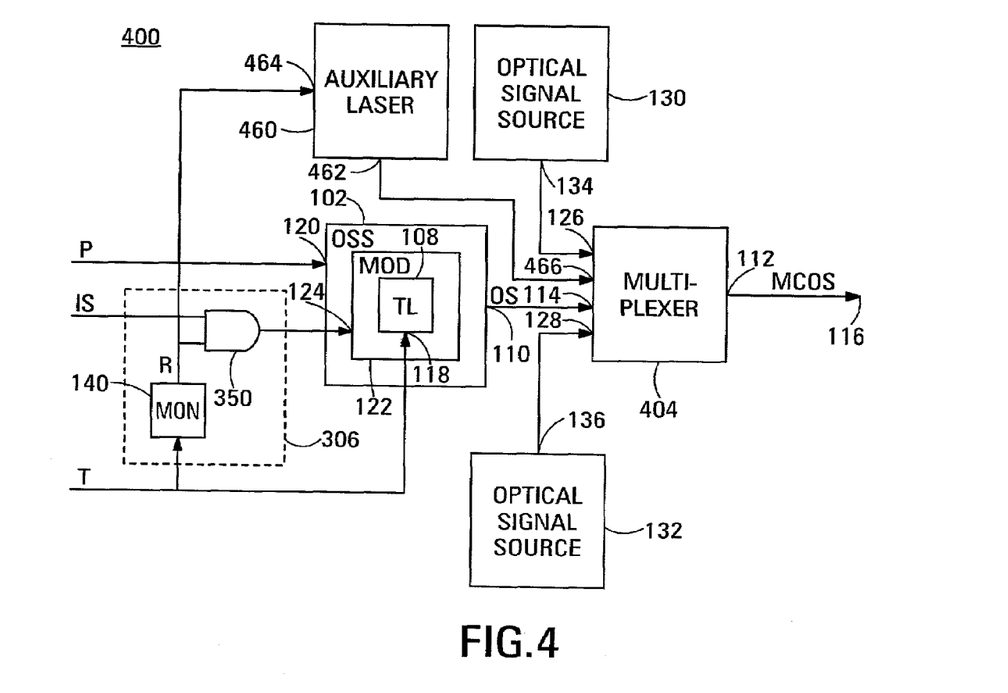
FIG. 4 is a schematic diagram of a fourth embodiment of a multi-channel optical transmitter according to the invention.

FIG. 4 shows a fourth embodiment 400 of a multi-channel optical transmitter according to the invention. The optical transmitter 400 is intended for use in optical communication systems that include optical elements that malfunction when the intensity of the optical signal OS output by the tunable optical signal source 102 is reduced. The optical transmitter 400 may also be used in optical communication systems that lack such optical elements. Elements of the optical transmitter 400 that correspond to elements of the optical transmitters described above with reference to FIGS. 1 and 3 are indicated using the same reference numerals and will not be described again here. The optical transmitter 400 is shown as including the intensity reducer 306 described above with reference to FIG. 3. However, this is not critical to the invention. The optical transmitter 400 may alternatively include the intensity reducer 106 described above with reference to FIG. 1, the intensity reducer 206 described above with reference to FIG. 2 or another form of intensity reducer.

The optical transmitter 400 additionally includes the auxiliary laser 460 having the light output 462 and the control input 464. The optical multiplexer 404 has the input 466 in addition to the above-described inputs 114, 126 and 128. The light output 462 of the auxiliary laser is optically coupled to the input 466 of the multiplexer. The output 112 of the multiplexer is optically coupled to the output 116 of the optical transmitter.

The control input 464 of the auxiliary laser 460 is connected to receive the intensity reduction control signal R. The intensity reduction control signal is shown as being generated by the monitor circuit 140, but may alternatively be generated by the tuning controller (not shown), as described above. The auxiliary laser 460 operates in response to the intensity reduction control signal R to generate light with an intensity similar to the average intensity of the optical signal OS output by the tunable optical signal source 102. For example, the intensity of the light generated by the auxiliary laser may be equal to the average intensity of the optical signal OS. In an embodiment, the light generated by the auxiliary laser has a wavelength in the source channel or the destination channel of the tunable laser 108.

The light generated by the auxiliary laser 460 may or may not be modulated. For example, the light generated by the auxiliary laser may be modulated with an information signal distinct from the information signals that modulate the optical signal sources 102, 130 and 132. Such distinctive information signal can be used to signal to optical devices optically coupled to the output 116 that the tunable laser 108 is being tuned, for example.

Asserting the intensity reduction control signal R causes the intensity reducer 306 to reduce the intensity of the optical signal OS during tuning of the tunable laser 108, as described above. Additionally, asserting the intensity reduction control signal R causes the auxiliary laser 460 to generate light during tuning of the tunable laser 108, i.e., while the intensity of the optical signal OS is reduced. The auxiliary laser supplies light to the multiplexer 404, and the multiplexer outputs the light generated by the auxiliary laser as part of the multi-channel optical signal MCOS. Thus, the multiplexer outputs the light generated by the auxiliary laser instead of the optical signal OS output by the tunable optical signal source 102. The light generated by the auxiliary laser prevents the reduction in the intensity of the optical signal OS from causing optical elements (not shown) that receive the multi-channel optical signal to malfunction.

The auxiliary laser 460 may also be added to the multi-channel optical transmitters described above with reference to FIGS. 1 and 2 by replacing the multiplexer 104 with the multiplexer 404 that has one more input than the multiplexer 104, and by connecting the light output 462 of the auxiliary laser to the additional input of the multiplexer 404.

The auxiliary laser 460 may alternatively be added to the multi-channel optical transmitters described above with reference to FIGS. 1, 2 and 3 by using an auxiliary two-input optical multiplexer (not shown). The light output 462 of the auxiliary laser 460 and the optical signal output 110 of the tunable optical signal source 102 are optically coupled to the inputs of the auxiliary multiplexer. The output of the auxiliary multiplexer is then optically coupled to the input 114 of the multiplexer 104 shown in FIGS. 1-3. With such an arrangement, the outputs of the auxiliary laser and the tunable optical signal source are combined using the auxiliary two-input multiplexer, and the resulting combined optical signal is optically coupled to the multiplexer 104 instead of the optical signal OS output by the tunable optical signal source 102.

Figure 5A:
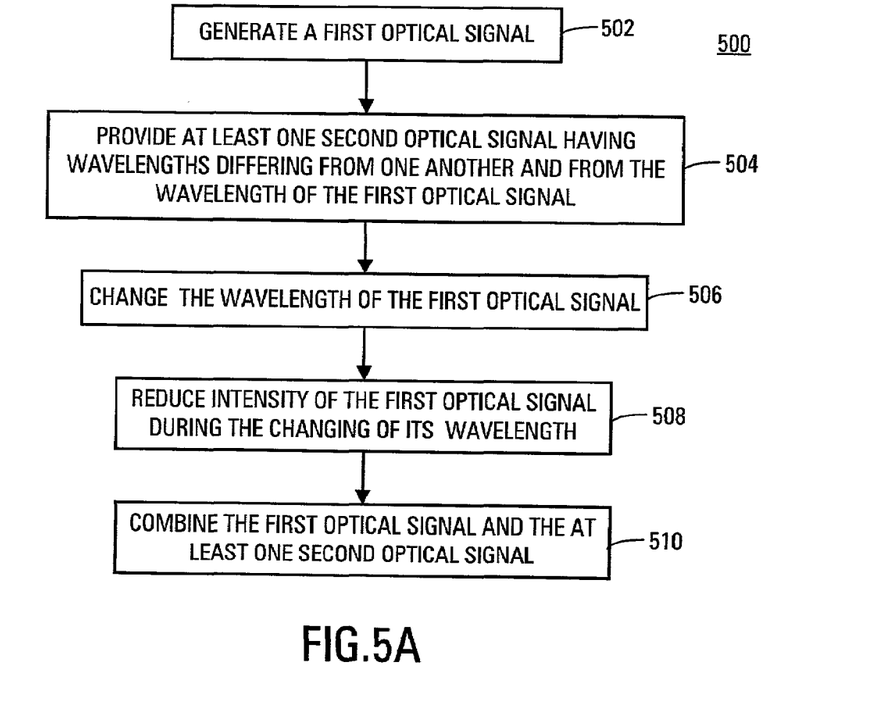
FIG. 5A is a flow chart illustrating a method according to the invention for transmitting a multi-channel optical signal.

FIG. 5A is a flow chart illustrating the method 500 according to the invention for transmitting a multi-channel optical signal.

In process 502, a first optical signal is generated.

In process 504, at least one second optical signal is provided. In an embodiment in which a single second optical signal is provided, the wavelength of the second optical signal differs from that of the first optical signal. In an embodiment in which more than one second optical signal is provided, the wavelengths of the second optical signals differ from one another and from the wavelength of the first optical signal.

In process 506, the wavelength of the first optical signal is changed.

In process 508, the intensity of the first optical signal is reduced during the changing of its wavelength.

Finally, in process 510, the first optical signal and the at least one second optical signal are combined.

Figure 5B:
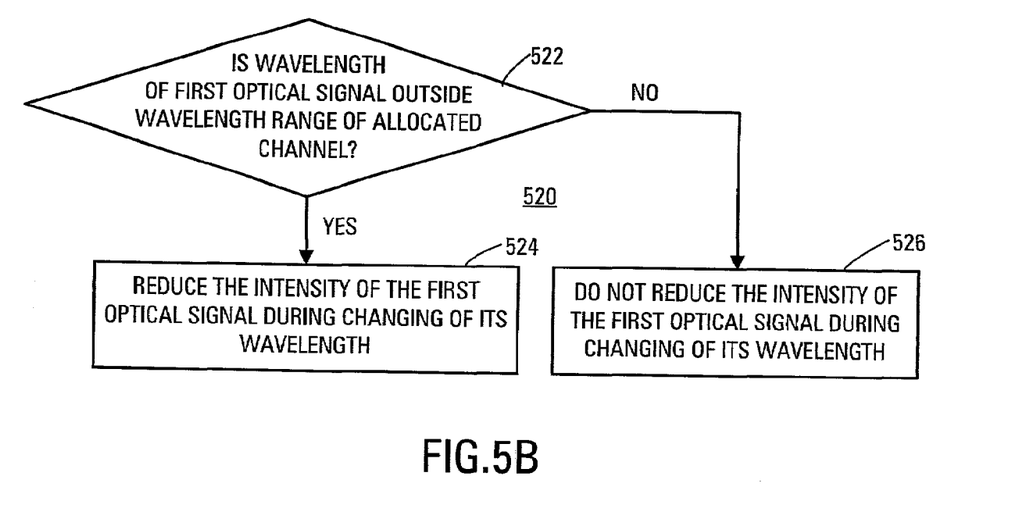
FIG. 5B is a flow chart illustrating an embodiment of process 508 of the method described above with reference to FIG. 5A.

FIG. 5B is a flow chart illustrating an embodiment 520 of process 508 of the method 500 described above with reference to FIG. 5A. In the embodiment 520, in process 522, a test is performed to determine whether the wavelength of the first optical signal is outside the wavelength range of the channel assigned to the first optical signal. A YES result in process 522 causes execution to advance to process 524, where the intensity of the first optical signal is reduced during the changing of its wavelength. A NO result in process 522 causes execution to branch to process 526, where the intensity of the first optical signal is not reduced during the changing of its wavelength.

Figure 5C:
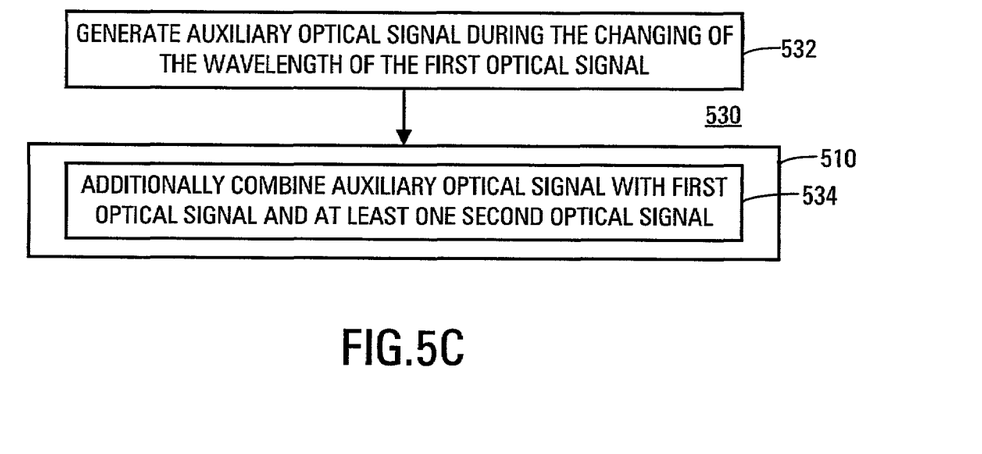
FIG. 5C is a flow chart illustrating part of a first variation on the method described above with reference to FIG. 5A.

FIG. 5C is a flow chart illustrating part of a first variation 530 on the method described above with reference to FIG. 5A. In the variation 530, the method 500 additionally includes process 532, and process 510 includes process 534. In process 532, an auxiliary optical signal is additionally generated during the changing of the wavelength of the first optical signal. In process 534, the auxiliary optical is additionally combined with the first optical signal and the at least one second optical signal.

In process 534, the auxiliary optical signal may additionally be combined with the first optical signal and the at least one second optical signal in a single combining operation. Alternatively, the auxiliary optical signal and the first optical signal may be combined to form a combined optical signal. The combined optical signal and the at least one second optical signal are then combined.

In an embodiment of process 508, the intensity of the first optical signal is reduced by interrupting the generating of the first optical signal. In an alternative embodiment of process 508, the intensity of the first optical signal is reduced prior to the combining.

Figure 5D:
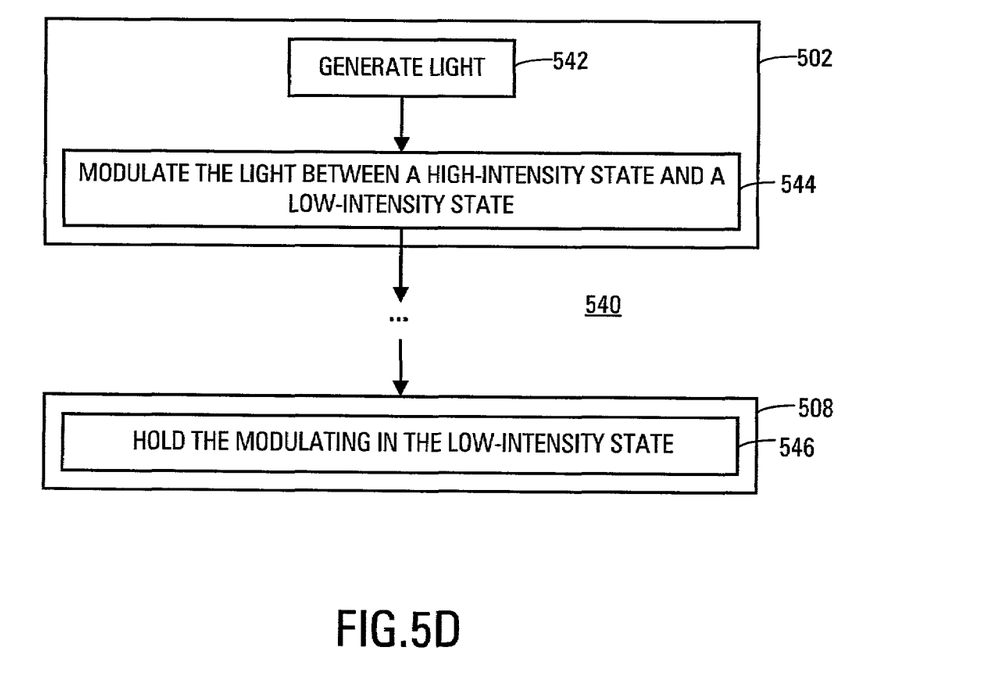
FIG. 5D is a flow chart illustrating part of a second variation on the method described above with reference to FIG. 5A.

FIG. 5D is a flow chart illustrating part of a second variation 540 on the method described above with reference to FIG. 5A. In the variation 540, process 502 includes processes 542 and 544, and process 508 includes process 546. In process 542, light is generated. In process 544, the light is modulated between a high-intensity state and a low-intensity state to generate the first optical signal. In process 546, the modulation is held in the low-intensity state. Holding the modulation in the low-intensity state reduces the intensity of the first optical signal.

This disclosure describes the invention in detail using illustrative embodiments. However, it is to be understood that the invention defined by the appended claims is not limited to the precise embodiments described.

We claim:

1. A multi-channel optical transmitter, comprising:
an optical multiplexer including inputs and an output;
a tunable optical signal source including a tunable laser, the tunable optical signal source additionally including an optical signal output through which the tunable optical signal source outputs an optical signal to one of the inputs of the optical multiplexer, the optical signal having an intensity;
intensity reducing means for reducing the intensity of the optical signal output by the tunable optical signal source during tuning of the tunable laser;
wherein noise is reduced on the output of the optical multiplexer during tuning of the tunable laser.

2. The multi-channel optical transmitter of claim 1, in which:
a first optical signal is assigned to a channel of the optical transmitter,
the channel having a wavelength range; and
the intensity reducing means reduces the intensity of the first optical signal only when the tunable laser is tuned outside the wavelength range of the channel.

3. The multi-channel optical transmitter of claim 1, in which the intensity reducing means includes a switch operating to disconnect power from the tunable laser during the tuning of the tunable laser.

4. The multi-channel optical transmitter of claim 1, in which the intensity reducing means includes a switch operating to divert current away from the tunable laser during the tuning of the tunable laser.

5. The multi-channel optical transmitter of claim 1, in which the intensity reducing means includes a light valve located between the tunable laser and the multiplexer.

6. The multi-channel optical transmitter of claim 1, in which:
the optical signal source additionally includes a modulator configured to modulate light generated by the tunable laser between a high-intensity state and a low intensity state; and
the intensity reducing means includes means for holding the modulator in a state corresponding to the low-intensity state.

7. The multi-channel optical transmitter of claim 1, additionally comprising:
an auxiliary laser including a light output coupled to another of the inputs of the optical multiplexer; and
means for activating the auxiliary laser when the intensity reducing means reduces the intensity of the optical signal.

8. The multi-channel optical transmitter of claim 7, in which the intensity reducing means includes a switch operating during the tuning of the tunable laser.

9. The multi-channel optical transmitter of claim 7, in which the intensity reducing means includes a light valve located between the tunable laser and the multiplexer.

10. The multi-channel optical transmitter of claim 7, in which:
the optical signal source additionally includes a modulator configured to modulate light generated by the tunable laser between a high-intensity state and a low intensity state; and the intensity reducing means includes means for holding the modulator in a state corresponding to the low-intensity state.

11. A method for transmitting a multi-channel optical signal, the method comprising:
   generating a first optical signal having a wavelength and an intensity;
   providing at least one second optical signal having wavelengths differing from one another and from the wavelength of the first optical signal;
   changing the wavelength of the first optical signal;
   reducing the intensity of the first optical signal during the changing of its wavelength, such that noise is reduced on an output of an optical multiplexer during tuning of a tunable laser;
   combining the first optical signal and the at least one second optical signal.

12. The method of claim 11, in which:
   a first optical signal is assigned to a channel of the multi-channel optical signal, the channel having a wavelength range; and
   reducing the intensity of the first optical signal includes reducing the intensity of the first optical signal only when the wavelength of the first optical signal is outside the wavelength range of the channel.

13. The method of claim 11, in which reducing the intensity of the first optical signal includes interrupting the generating of the first optical signal.

14. The method of claim 11, in which reducing the intensity of the first optical signal includes reducing the intensity of the first optical signal prior to the combining.

15. The method of claim 11, in which:
   generating the first optical signal includes:
   generating light, and
   modulating the light between a high intensity state and a low-intensity state; and
   reducing the intensity of the first optical signal includes holding the modulating in the low-intensity state.

16. The method of claim 11, in which:
   the method additionally comprises generating an auxiliary optical signal during the changing of the wavelength of the first optical signal; and
   combining the first optical signal and the at least one second optical signal includes additionally combining the auxiliary optical with the first optical signal and the at least one second optical signal.

17. The method of claim 16, in which combining the auxiliary optical signal with the first optical signal and the at least one second optical signal includes:
   combining the auxiliary optical signal and the first optical signal to form a combined optical signal; and
   combining the combined optical signal and the at least one second optical signal.

18. The method of claim 17, in which reducing the intensity of the first optical signal includes interrupting the generating of the first optical signal.

19. The method of claim 17, in which reducing the intensity of the first optical signal includes reducing the intensity of the first optical signal prior to the combining.

20. The method of claim 17, in which: generating the first optical signal includes:
   generating light, and
   modulating the light between a high intensity state and a low-intensity state; and
   reducing the intensity of the first optical signal includes holding the modulating in the low-intensity state.

21. A system for transmitting a multi-channel optical signal, the system comprising:
   means for generating a first optical signal having a wavelength and an intensity;
   means for providing at least one second optical signal having wavelengths differing from one another and from the wavelength of the first optical signal;
   means for changing the wavelength of the first optical signal;
   means for reducing the intensity of the first optical signal during the changing of its wavelength, such that noise is reduced on an output of an optical multiplexer during tuning of a tunable laser;
   means for combining the first optical signal and the at least one second optical signal.

* * * * *